US010473225B2

(12) United States Patent
DeFelice et al.

(10) Patent No.: US 10,473,225 B2
(45) Date of Patent: Nov. 12, 2019

(54) PASSIVE VALVE

(71) Applicant: Hamilton Sundstrand Corporation, Charlotte, NC (US)

(72) Inventors: Robert DeFelice, South Windsor, CT (US); Scott W. Simpson, Easthampton, MA (US)

(73) Assignee: Hamilton Sundstrand Corporation, Charlotte, NC (US)

(*) Notice: Subject to any disclaimer, the term of this patent is extended or adjusted under 35 U.S.C. 154(b) by 37 days.

(21) Appl. No.: 15/939,855

(22) Filed: Mar. 29, 2018

(65) Prior Publication Data

US 2019/0301627 A1    Oct. 3, 2019

(51) Int. Cl.
| | |
|---|---|
| *F16K 1/12* | (2006.01) |
| *F16K 17/10* | (2006.01) |
| *F16K 17/04* | (2006.01) |
| *F16K 31/122* | (2006.01) |
| *G05D 7/01* | (2006.01) |

(52) U.S. Cl.
CPC ............ *F16K 17/10* (2013.01); *F16K 17/044* (2013.01); *F16K 31/1221* (2013.01); *F16K 31/1223* (2013.01); *F16K 31/1225* (2013.01); *G05D 7/014* (2013.01); *Y10T 137/3367* (2015.04)

(58) Field of Classification Search
CPC ...... F02C 6/08; F16K 1/126; Y10T 137/3367; Y10T 137/3421; Y10T 137/7835
USPC ........................ 251/149.6; 415/144
See application file for complete search history.

(56) References Cited

U.S. PATENT DOCUMENTS

| | | | | |
|---|---|---|---|---|
| 3,003,516 | A * | 10/1961 | Granberg | G01F 15/005 137/220 |
| 3,447,774 | A | 6/1969 | Howland | |
| 3,586,033 | A * | 6/1971 | Hieber | B64D 39/06 137/220 |
| 5,799,688 | A | 9/1998 | Yie | |
| 5,860,447 | A | 1/1999 | Chu | |
| 6,230,734 | B1 * | 5/2001 | Grebnev | F16K 1/123 137/220 |
| 7,284,471 | B2 | 10/2007 | Jacobsen et al. | |
| 7,347,406 | B2 | 3/2008 | Shigetaka | |
| 7,730,875 | B2 | 6/2010 | Mori et al. | |
| 9,611,941 | B1 | 4/2017 | DeFelice et al. | |
| 9,845,899 | B2 | 12/2017 | Graichen et al. | |
| 10,001,026 | B2 * | 6/2018 | Schwalm | F02C 6/08 |
| 2002/0005217 | A1 * | 1/2002 | Lyons | F16K 1/126 137/220 |

(Continued)

FOREIGN PATENT DOCUMENTS

| | | |
|---|---|---|
| EP | 3056739 A1 | 8/2016 |
| WO | WO-2017139678 A1 | 8/2017 |

*Primary Examiner* — Robert K Arundale
(74) *Attorney, Agent, or Firm* — Locke Lord LLP; Daniel J. Fiorello; Joshua L. Jones

(57) ABSTRACT

A passive in-line valve configured to be actuated without an external control includes a valve housing defining an inlet, an outlet, and a flow path between the inlet and the outlet and a piston housing extending inwardly from the housing. The valve includes a valve piston movably disposed within the piston housing, the valve piston including an upstream side and a downstream side. The valve also includes a control mechanism disposed at least partially within the housing and configured to port outlet static pressure to the upstream cavity in a first state such that pressure is equalized on the valve piston.

20 Claims, 6 Drawing Sheets

(56) References Cited

U.S. PATENT DOCUMENTS

2011/0139284 A1 6/2011 Dyer
2016/0273450 A1* 9/2016 Marocchini .......... F01D 17/105

* cited by examiner

PASSIVE VALVE

STATEMENT OF GOVERNMENT RIGHTS

This invention was made with government support under contract no. FA8626-16-C-2139 awarded by the Air Force. The government has certain rights in the invention.

BACKGROUND

1. Field

The present disclosure relates to valves, more specifically to passive valves.

2. Description of Related Art

For certain valve applications, as pressure increases from low to high, the valve must remain open until a closing trigger pressure is reached, at which time it must fully close. As pressure decreases from high to low, the valve must remain closed until an opening trigger pressure is reached, at which time it must fully open. However, to achieve this, traditional valves require an external controller to monitor when a certain pressure threshold is reached and to cause actuation of the valve.

Such conventional methods and systems have generally been considered satisfactory for their intended purpose. However, there is still a need in the art for improved passive valves. The present disclosure provides a solution for this need.

SUMMARY

In accordance with at least one aspect of this disclosure, a passive in-line valve configured to be actuated without an external control includes a valve housing defining an inlet, an outlet, and a flow path between the inlet and the outlet and a piston housing extending inwardly from the housing. The valve includes a valve piston movably disposed within the piston housing, the valve piston including an upstream side and a downstream side. The valve piston is configured to define an upstream cavity between the piston housing and the upstream side of the valve piston and wherein the downstream side is in fluid communication with outlet static pressure. The valve piston is configured to move between an open position where fluid can flow from the inlet, through the flow path, to the outlet, and a closed position where the valve piston prevents flow from the inlet to the outlet.

The valve includes a control mechanism disposed at least partially within the housing and configured to port outlet static pressure to the upstream cavity in a first state such that pressure is equalized on the valve piston. The control mechanism is configured to port inlet pressure to the upstream cavity in a second state such that a differential pressure on the valve piston acts on the valve piston. The control mechanism is configured to transition from the first state to the second state at a first threshold valve delta pressure and the control mechanism is configured to transition from the second state to the first state at a second threshold valve delta pressure.

The second threshold valve delta pressure can be lower than first threshold valve delta pressure. The valve piston can be biased toward the open position such that when the control mechanism is in the first state, the valve piston moves toward the open position. The valve piston can be biased with a valve piston spring.

The valve piston spring can be disposed between the downstream side of the valve piston and a spring housing that is connected to the valve housing. The downstream side of the valve piston can define and an internal cavity.

The control mechanism can include a sheath fixed relative to the valve housing and having one or more vent holes configured to be in fluid communication with the upstream cavity in at least one of the first state or the second state and an inlet hole in fluid communication with the inlet. The control mechanism can include a control piston slidably disposed within the sheath in a sealed relationship with the sheath. The control piston can be configured to be in a first position in the first state to block inlet pressure from communicating with the one or more vent holes and a second position in the second state where the control piston allows inlet pressure to be in fluid communication with the one or more vent holes.

The control piston can be biased to the first position with a control spring. A spring installation force of the control spring can be selected to cause actuation of the valve piston at a predetermined inlet pressure. The sheath can be in fluid communication with the outlet static pressure.

The control piston can allow outlet static pressure through at least one of the one or more vent holes in the first position to equalize pressure on the valve piston. The one or more vent holes can include one or more axially forward vent holes and one or more axially aft vent holes such that the one or more axially aft vent hole is in fluid communication with the outlet static pressure and the one or more axially forward vent holes are blocked when the control piston is in the first position.

The control mechanism can include a spring guide for guiding the control spring and for mounting the control mechanism to the spring housing. The sheath can be in fluid communication with the inlet through an aperture defined in the piston housing.

In certain embodiments, the control piston can include a cup shape. An inner diameter of the cup shape can include a same cross-sectional area as the aperture, for example.

The valve piston can be slidably sealed against the piston housing and is configured to slidably seal against the valve housing at the outlet to block flow. In certain embodiments, the housing can include an inlet housing and an outlet housing attached together.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
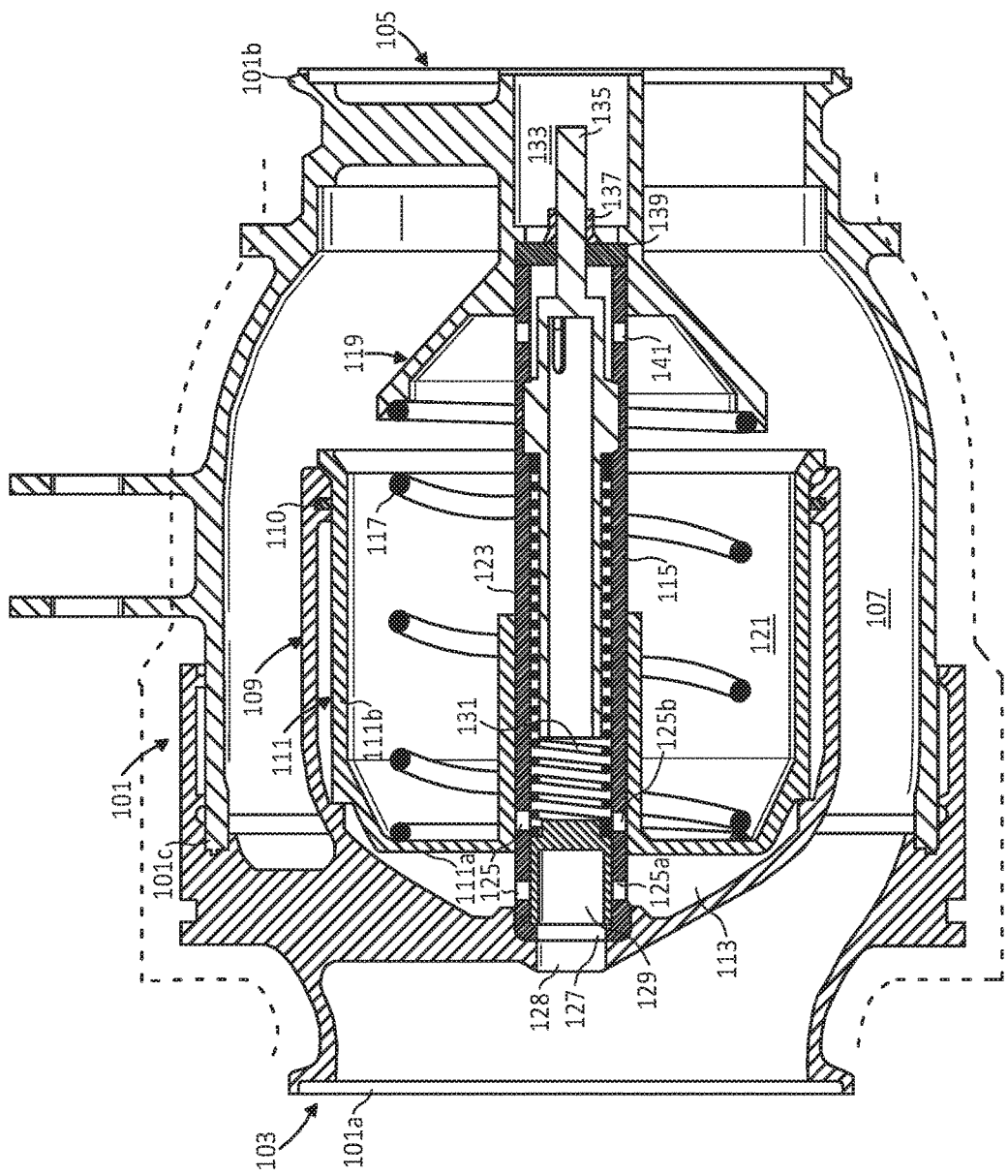
FIG. 1 is a cross-sectional view of an embodiment of a valve in accordance with this disclosure, shown in an open state.

Reference will now be made to the drawings wherein like reference numerals identify similar structural features or aspects of the subject disclosure. For purposes of explanation and illustration, and not limitation, an illustrative view of an embodiment of a valve in accordance with the disclosure is shown in FIG. 1 and is designated generally by reference character 100. Other embodiments and/or aspects of this disclosure are shown in FIGS. 2 and 3a-3d. Embodiments described herein can be used as passive fluid valves, and/or for any other suitable purpose or in any other suitable way.

In accordance with at least one aspect of this disclosure, a passive in-line valve 100 configured to be actuated without an external control includes a valve housing 101 defining an inlet 103, an outlet 105, and a flow path 107 between the inlet 103 and the outlet 105. The valve housing 101 can be a single piece (e.g., additively manufactured), and/or can be comprised of any suitable number of components. For example, as shown, the valve housing 101 can include an inlet housing 101a and an outlet housing 101b attached together (e.g., with a metal c-seal 101c or any other suitable seal disposed therein).

The valve housing 101 includes a piston housing 109 extending inwardly from the valve housing 101. The valve 100 includes a valve piston 111 movably disposed within the piston housing 109, the valve piston 111 including an upstream side 111a and a downstream side 111b. The valve piston 111 can be made of any suitable material (e.g., wrought metal such as INCO718) and can include any suitable coating(s) (e.g., an outer diameter surface coating of chromium carbide applied via high velocity oxygen fuel (HVOF) coating and/or an impact surface coating of triballoy or stellite 6B sleeve).

Figure 3A:
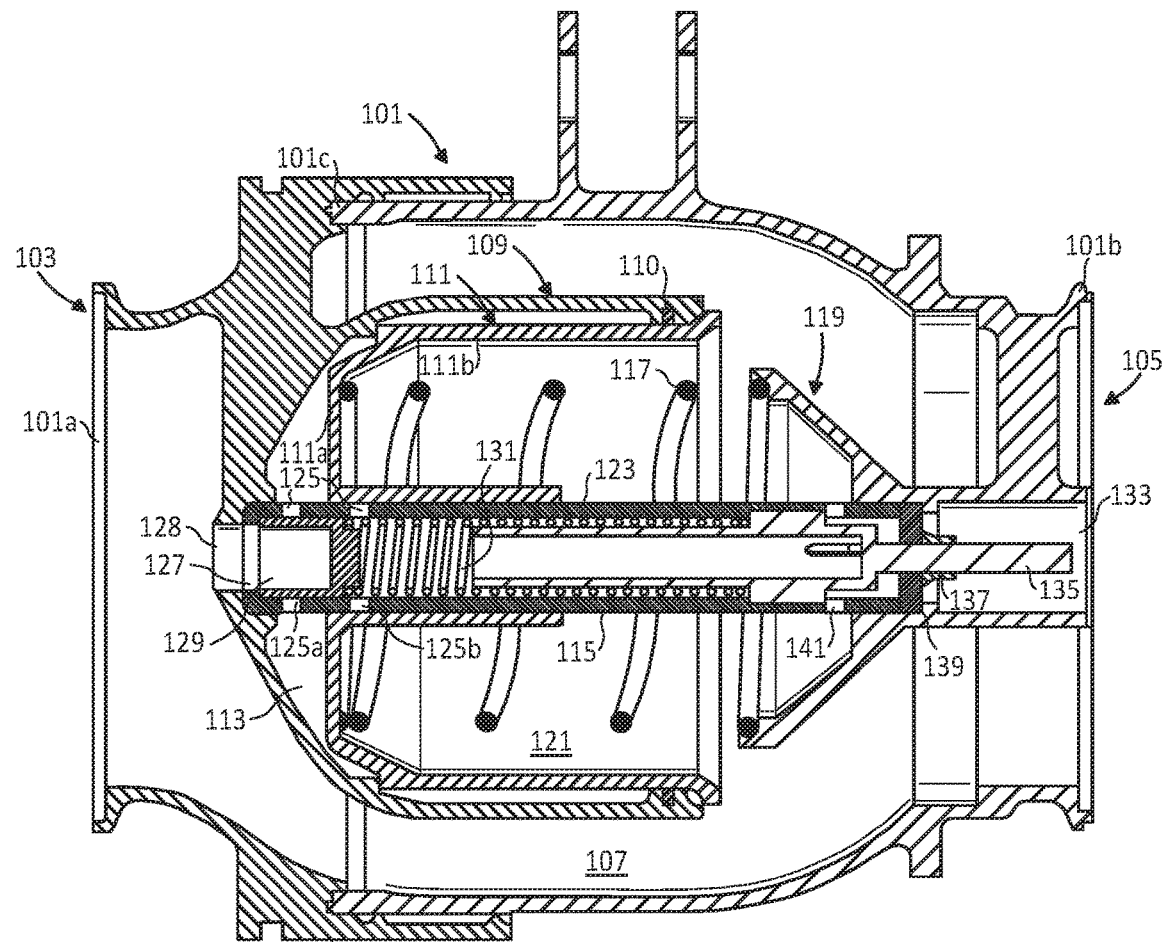
FIG. 3a is a schematic diagram showing an embodiment of a valve in accordance with this disclosure in a first state.
Figure 3B:
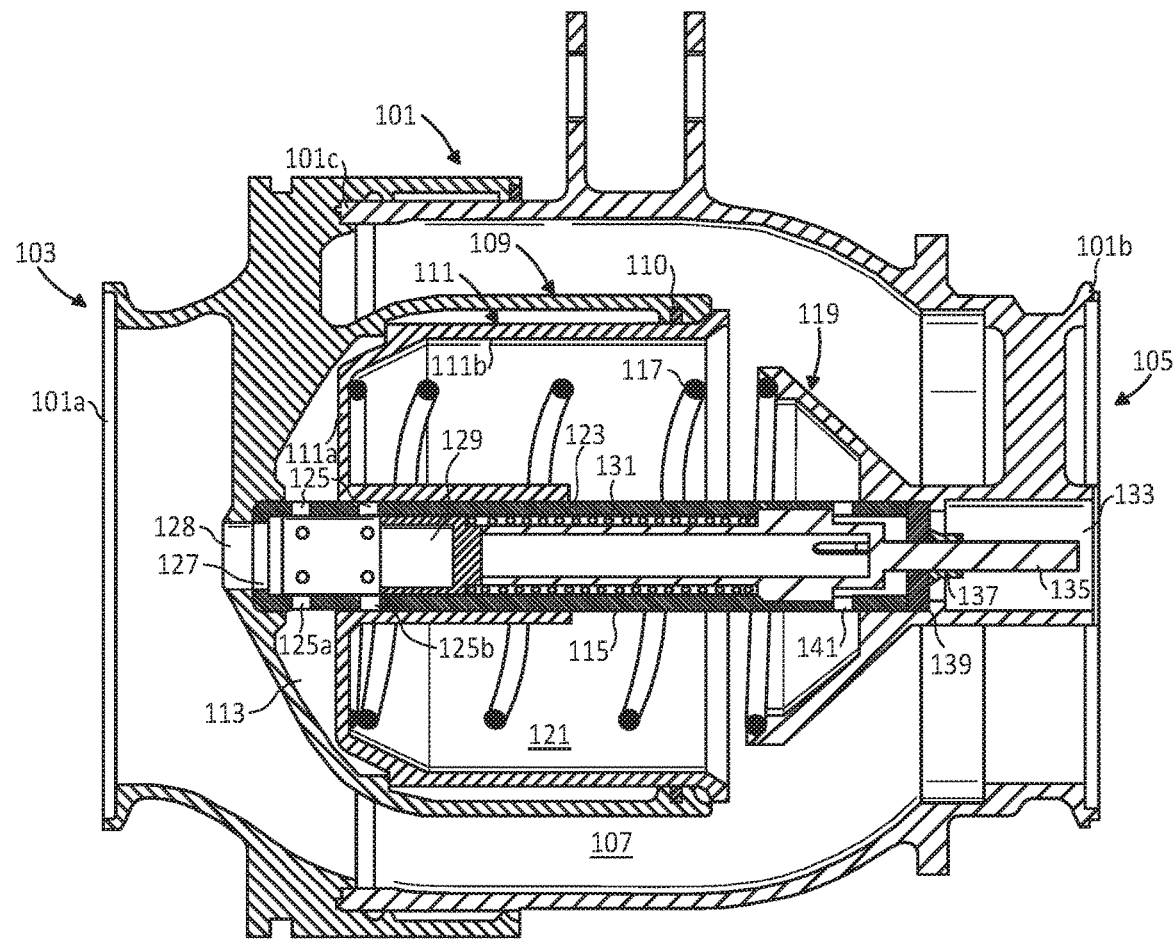
FIG. 3b is a schematic diagram showing an embodiment of a valve in accordance with this disclosure in a second state.
Figure 3C:
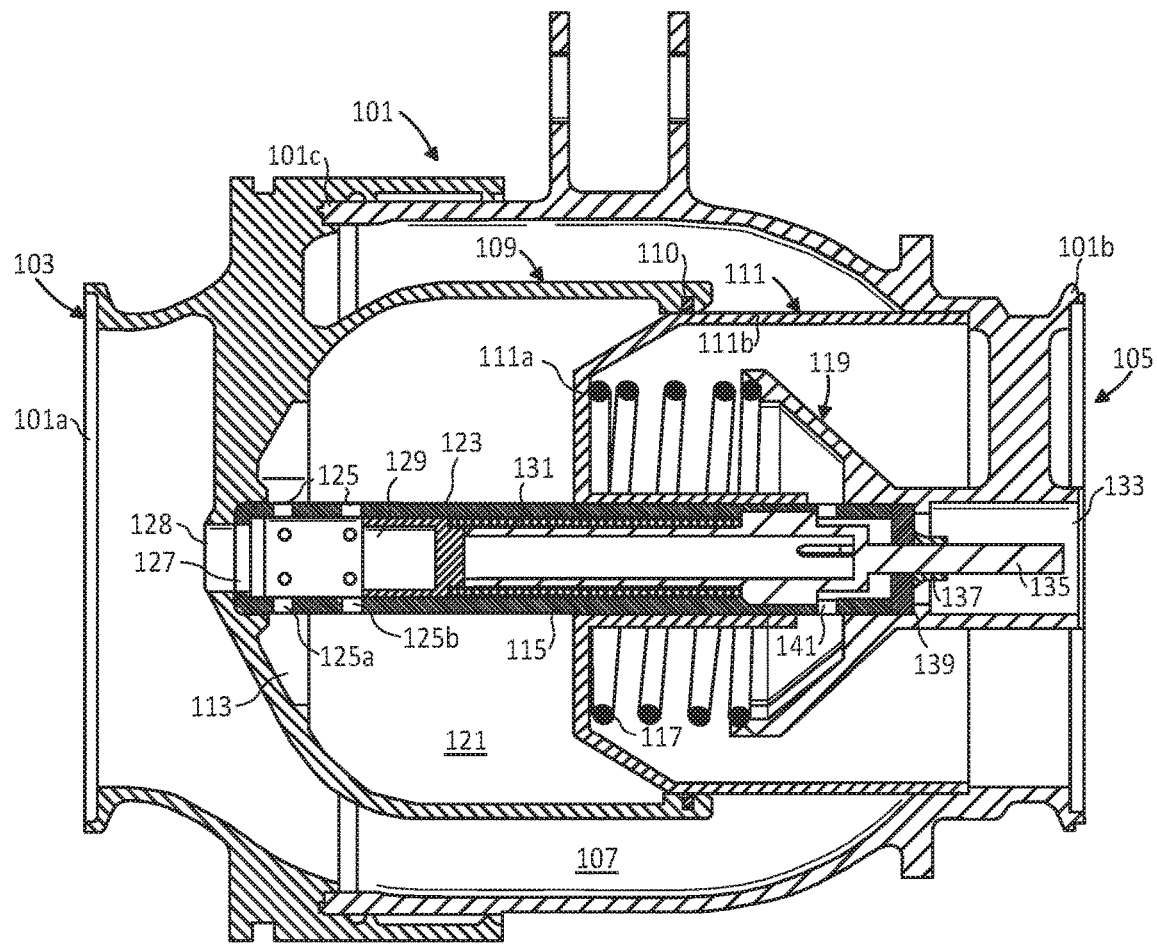
FIG. 3c is a schematic diagram showing an embodiment of a valve in accordance with this disclosure in a third state.
Figure 3D:
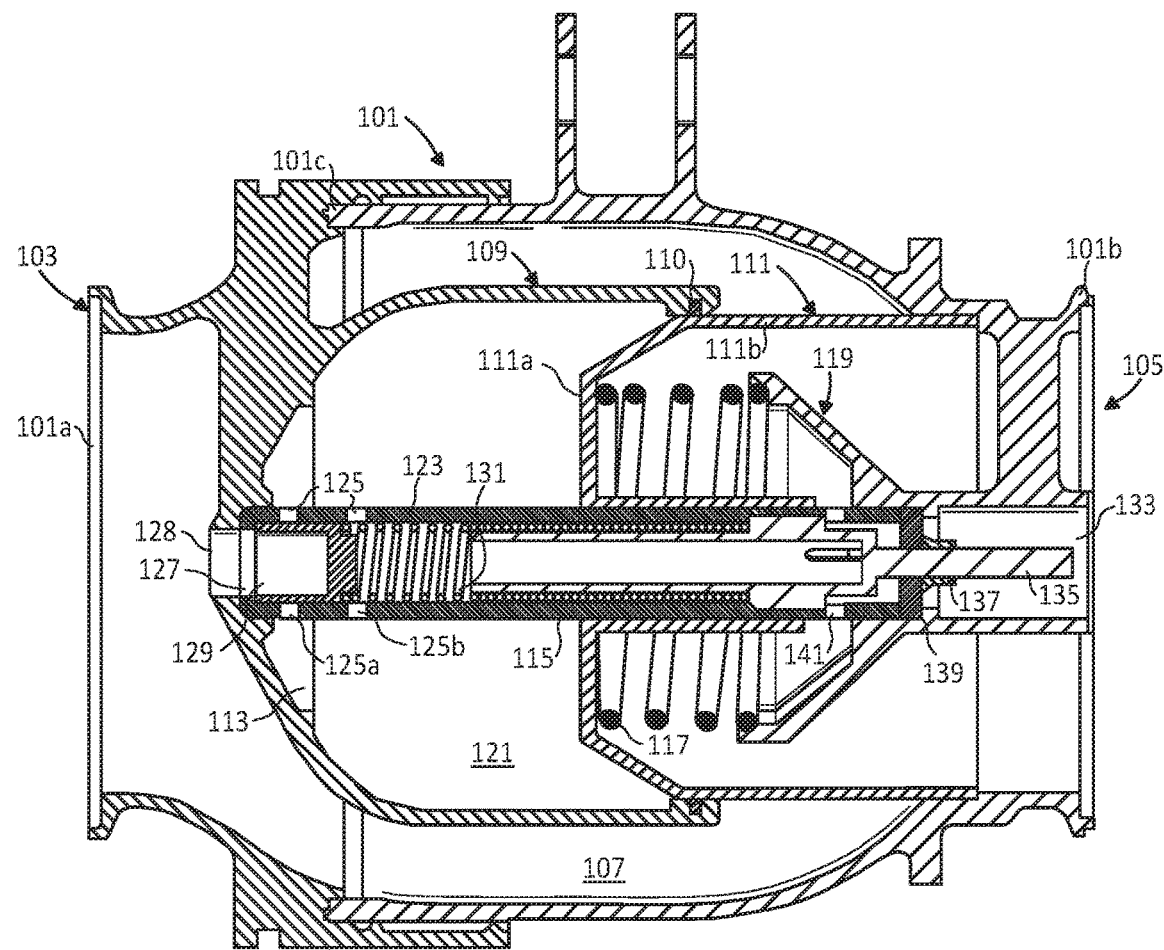
FIG. 3d is a schematic diagram showing an embodiment of a valve in accordance with this disclosure in a fourth state.

The valve piston 111 is configured to define an upstream cavity 113 between the piston housing 109 and the upstream side 111a of the valve piston 111. The downstream side 111b of the valve piston 111 is in fluid communication with outlet static pressure. The valve piston 111 is configured to move between an open position (e.g., as shown in FIG. 1 and FIGS. 3a and 3b) where fluid can flow from the inlet 103, through the flow path 107, to the outlet 105, and a closed position (e.g., as shown in FIGS. 3c and 3d) where the valve piston 111 prevents flow from the inlet 103 to the outlet 105. The valve piston 111 can be slidably sealed against the piston housing 109 (e.g., via a piston ring 110 and/or via tight tolerance fitting) and is configured to slidably seal against the valve housing 101 at the outlet 105 to block flow (e.g., via tight tolerances as shown in FIGS. 3c and 3d or using any suitable seal).

The valve 100 also includes a control mechanism 115 disposed at least partially within the valve housing 101 and configured to port outlet static pressure to the upstream cavity 113 in a first state (e.g., as shown in FIG. 1 and FIGS. 3b and 3c) such that pressure is equalized on the valve piston 111. The control mechanism 115 is configured to port inlet pressure to the upstream cavity 113 in a second state (e.g., as shown in FIGS. 3a and 3d) such that a differential pressure on the valve piston 111 acts on the valve piston 111. The control mechanism 115 is configured to transition from the first state to the second state at a first threshold valve delta pressure and the control mechanism is configured to transition from the second state to the first state at a second threshold valve delta pressure.

Figure 2:
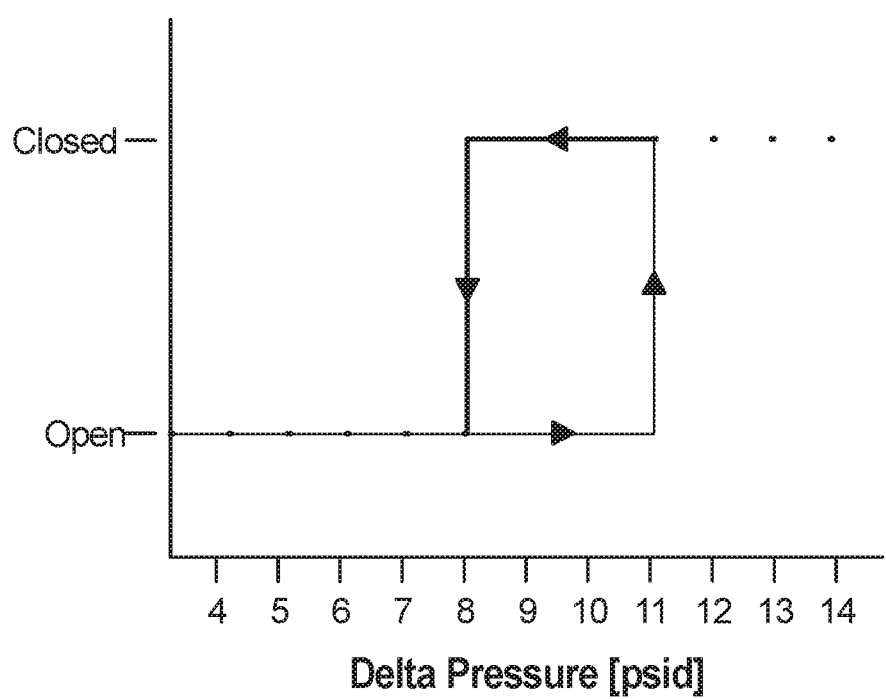
FIG. 2 is a state diagram for an embodiment of a valve in accordance with this disclosure, showing the relationship between delta pressure on the valve and the state of the valve.

The second threshold valve delta pressure can be lower than first threshold valve delta pressure, e.g., as shown in FIG. 2. As shown, in at least some embodiments, the valve piston 111 can be biased toward the open position such that when the control mechanism 115 is in the first state, the valve piston moves 111 toward the open position. For example, the valve piston 111 can be biased with a valve piston spring 117.

The valve piston spring 117 can be disposed between the downstream side 111b of the valve piston 111 and a spring housing 119 that is connected to the valve housing 101. In certain embodiments, the downstream side 111b of the valve piston 111 can define and an internal cavity 121 (e.g., in which the valve spring 117 can be at least partially housed).

The control mechanism 115 can include a sheath 123 fixed relative to the valve housing 101 and having one or more vent holes 125 configured to be in fluid communication with the upstream cavity 113 in at least one of the first state or the second state. The sheath 123 also includes an inlet hole 127 in fluid communication with the inlet 103. The sheath 123 can be in fluid communication with the inlet 103 through an aperture 128 defined in the piston housing 109. The sheath 123 can be made of any suitable material (e.g., wrought INCO718) and/or have any suitable coating (e.g., an outer diameter surface coated with chromium carbide applied via a super D-gun).

The control mechanism 115 can include a control piston 129 slidably disposed within the sheath 123 in a sealed relationship with the sheath 123. The control piston 129 can be made of any suitable material (e.g., wrought INCO718) and/or include any suitable coating (e.g., an outer diameter coating of chromium carbide as described above). The control piston 129 can be configured to be in a first position in the first state (e.g., as shown in FIGS. 3a and 3d) to block inlet pressure from communicating with the one or more vent holes 125. The control piston 129 can be configured to be in a second position in the second state (e.g., as shown in FIGS. 3b and 3c) where the control piston 115 allows inlet pressure to be in fluid communication with the one or more vent holes 125.

As shown, in certain embodiments, the control piston 129 can be biased to the first position with a control spring 131 or any other suitable biasing member or method. A spring installation force of the control spring 131 can be selected to cause actuation of the valve piston 111 at a predetermined inlet pressure and/or delta pressure across the valve 100. The installation force and spring rate of the piston spring can be determined such that it will overcome frictional loading to open the valve, but not inhibit the valve closing when acted on by upstream pressure passed to it by the control mechanism.

The sheath 123 can be in fluid communication with the outlet static pressure (e.g., at a downstream end thereof). For example, the sheath 123 can be disposed in or mounted to the spring housing 119 which can include a passageway 133 for receiving outlet static pressure. The control piston 129 can allow outlet static pressure through at least one of the one or more vent holes 125 in the first position to equalize pressure on the valve piston 111. The one or more vent holes 125 can include one or more axially forward vent holes 125a and one or more axially aft vent holes 125b such that the one or more axially aft vent hole 125b is in fluid communication with the outlet static pressure and the one or more axially forward vent holes 125a are blocked when the control piston 129 is in the first position (e.g., as shown in FIG. 1 and FIGS. 3a and 3d). In certain embodiments, in the second position, the one or more forward vent holes 125a and the aft vent holes 125b can be in fluid communication with the inlet pressure, however, it is contemplated that at least the aft vent holes 125b can be blocked.

The control mechanism 115 can include a spring guide 135 for guiding the control spring 131. In certain embodiments, the spring guide 135 can also mount the control mechanism 115 to the spring housing 119 (e.g., via a locking nut 137 and a retaining plate 139, or in any other suitable manner). The retaining plate 139 can be stacked between the sheath 123 and the spring housing 119 and may not touch the spring guide 135. The lock nut 137 can lock the spring guide 135 to the retaining plate 139 to hold it in position.

The spring guide 135 can be hollow and/or include one or more windows to allow outlet static pressure to pass therethrough. The spring guide 135 can additionally or alternatively allow outlet static pressure to communicate with the sheath around the spring guide 135. In certain embodiments, the outlet static pressure can communicate with the internal cavity 121 through one or more static vent holes 141 in the sheath 123, and/or in any other suitable manner. A function of spring guide 135 can include acting as stop surface for the control piston 129. The spring guide 135 can have any suitable geometry.

In certain embodiments, the control piston 129 can include a cup shape. For example, an inner diameter of the cup shape can include a same cross-sectional area as the aperture 128 and/or the opening 127, for example. In this regard, the resulting force acting on the control piston 129 will increase when the control piston 129 lifts away from the first position and more surface area (e.g., the rim of the cup shape) of the control piston 129 is exposed. In certain embodiments, to avoid instability, this increase in force can be used in determining the spring rate of the control spring, as the change in force can drive the control piston to be in contact with the spring guide.

Embodiments include a passive valve, meaning it can act solely based on the conditions present at the inlet 103 and outlet 105, i.e., without external control required. Embodiments include a binary position valve that includes snap-action such that no steady state point exists anywhere between the full open and full closed conditions. Embodiments include a hysteresis band which prevents dynamic instability.

Referring additionally to FIGS. 2 and 3, embodiments of a control mechanism are positioned such that the total inlet pressure acts on the control piston. In certain embodiments, the force generated by the inlet fluid is counteracted by the control spring and the downstream outlet static pressure acting on the backside of the control piston. In certain embodiments, as shown in FIGS. 3a-3d, the control piston can remain seated in the closed position (e.g., as shown in FIG. 3a) until the force created by the delta pressure across the valve is larger than the control spring installed force. In certain embodiments, when such a trigger pressure is reached, the control piston can move slightly off the seat, exposing a larger surface area on the upstream side of the piston. In certain embodiments, when that occurs, the force can be larger enough to move the control piston to its full open position as shown in FIG. 3b. The movement of the control piston can expose holes in the sheath and allow inlet fluid to fill the upstream cavity of the valve at the inlet pressure. When the upstream cavity fills with inlet fluid, the force generated can be enough to move the valve piston to the closed position, e.g., as shown in FIG. 3c.

When the delta pressure across the valve decreases, this can cause the control piston to slowly move from its fully open position due to the control spring force. When the control piston moves far enough to expose to vent holes in the sheath, e.g., as shown in FIG. 3d, the fluid in the upstream cavity can be dumped to the downstream side of the valve. The valve spring can then cause the valve piston to move to the full open position, e.g., as shown in FIG. 3a because the valve spring can now overcome the forces on the valve piston, which are equalized to outlet static pressure. In certain embodiments, the valve opening can occur at a lower pressure than the valve closing trip point, e.g., to ensure dynamic stability of the valve.

Embodiments include a passive inline valve (e.g., an air valve) that allows control without a controller or any actuator. Embodiments can be used as a pneumatic bleed valve for turbomachine or for any other suitable use. One or more shims can be used for eliminating clearance and controlling amount of interference between any of the suitable components of the valve 100. Embodiments allow spring characteristics to be selected to provide predetermined switch over pressures between opening and closing the valve.

Traditional inline valves have been controlled with external, active control mechanisms such as solenoids. Certain embodiments allow a passive valve and ensure there is no steady state point between full open and full closed.

Any suitable combination(s) of any disclosed embodiments and/or any suitable portion(s) thereof is contemplated therein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A passive in-line valve configured to be actuated without an external control, comprising:
   a valve housing defining an inlet, an outlet, and a flow path between the inlet and the outlet;
   a piston housing extending inwardly from the housing;
   a valve piston movably disposed within the piston housing, the valve piston including an upstream side and a downstream side, wherein the valve piston is configured to define an upstream cavity between the piston housing and the upstream side of the valve piston and wherein the downstream side is in fluid communication with outlet static pressure, wherein the valve piston is configured to move between an open position where fluid can flow from the inlet, through the flow path, to the outlet, and a closed position where the valve piston prevents flow from the inlet to the outlet, a control mechanism disposed at least partially within the housing and configured to port outlet static pressure to the upstream cavity in a first state such that pressure is equalized on the valve piston, wherein the control mechanism is configured to port inlet pressure to the upstream cavity in a second state such that a differential pressure on the valve piston acts on the valve piston, wherein the control mechanism is configured to transition from the first state to the second state at a first threshold valve delta pressure, wherein the control mechanism is configured to transition from the second state to the first state at a second threshold valve delta pressure.

2. The valve of claim 1, wherein the second threshold valve delta pressure is lower than first threshold valve delta pressure.

3. The valve of claim 1, wherein the valve piston is biased toward the open position such that when the control mechanism is in the first state, the valve piston moves toward the open position.

4. The valve of claim 3, wherein the valve piston is biased with a valve piston spring.

5. The valve of claim 4, wherein the valve piston spring is disposed between the downstream side of the valve piston and a spring housing that is connected to the valve housing.

6. The valve of claim 5, wherein the downstream side of the valve piston defines and an internal cavity.

7. The valve of claim 6, wherein the valve piston made of metal.

8. The valve of claim 6, wherein the control mechanism includes a sheath fixed relative to the valve housing and having one or more vent holes configured to be in fluid communication with the upstream cavity in at least one of the first state or the second state and an inlet hole in fluid communication with the inlet.

9. The valve of claim 8, wherein the control mechanism includes a control piston slidably disposed within the sheath in a sealed relationship with the sheath, wherein the control piston is configured to be in a first position in the first state to block inlet pressure from communicating with the one or more vent holes and a second position in the second state where the control piston allows inlet pressure to be in fluid communication with the one or more vent holes.

10. The valve of claim 9, wherein the control piston is biased to the first position with a control spring.

11. The valve of claim 10, wherein a spring constant of the piston spring and a spring constant of the control spring are selected to cause actuation of the valve piston at a predetermined inlet pressure.

12. The valve of claim 10, wherein the sheath is in fluid communication with the outlet static pressure.

13. The valve of claim 12, wherein the control piston allows outlet static pressure through at least one of the one or more vent holes in the first position to equalize pressure on the valve piston.

14. The valve of claim 13, wherein the one or more vent holes include one or more axially forward vent holes and one or more axially aft vent holes, wherein the one or more axially aft vent hole is in fluid communication with the outlet static pressure and the one or more axially forward vent holes are blocked when the control piston is in the first position.

15. The valve of claim 14, wherein the control mechanism includes a spring guide for guiding the control spring and for mounting the control mechanism to the spring housing.

16. The valve of claim 15, wherein the sheath is in fluid communication with the inlet through an aperture defined in the piston housing.

17. The valve of claim 16, wherein the control piston is includes a cup shape.

18. The valve of claim 17, wherein an inner diameter of the cup shape includes a same cross-sectional area as the aperture.

19. The valve of claim 18, wherein the valve piston is slidably sealed against the piston housing and is configured to slidably seal against the valve housing at the outlet to block flow.

20. The valve of claim 1, wherein the housing includes an inlet housing and an outlet housing attached together.

* * * * *